US011302199B2

(12) United States Patent
Klüßendorf et al.

(10) Patent No.: US 11,302,199 B2
(45) Date of Patent: Apr. 12, 2022

(54) DETERMINING A REGION OF IMPACT OF AN AIRCRAFT IN THE EVENT OF AN EMERGENCY

(71) Applicant: Airbus Defence and Space GmbH, Taufkirchen (DE)

(72) Inventors: Fabian Klüßendorf, Taufkirchen (DE); Paul Stevens, Stevenage (GB); Steve Tate, Stevenage (GB)

(73) Assignee: Airbus Defence and Space GmbH

( * ) Notice: Subject to any disclaimer, the term of this patent is extended or adjusted under 35 U.S.C. 154(b) by 225 days.

(21) Appl. No.: 16/717,269

(22) Filed: Dec. 17, 2019

(65) Prior Publication Data
US 2020/0226934 A1  Jul. 16, 2020

(30) Foreign Application Priority Data

Jan. 11, 2019  (DE) .................... 10 2019 100 605.8

(51) Int. Cl.
*G08G 5/00* (2006.01)
*B64F 5/60* (2017.01)
*B64C 39/02* (2006.01)

(52) U.S. Cl.
CPC ............. *G08G 5/0013* (2013.01); *B64F 5/60* (2017.01); *B64C 39/024* (2013.01)

(58) Field of Classification Search
CPC .................................................. B64D 45/04
See application file for complete search history.

(56) References Cited

U.S. PATENT DOCUMENTS

| 3,750,166 | A  | * | 7/1973  | Dearth  | G01S 13/78 |
| | | | | | 342/30 |
| 5,265,024 | A  | * | 11/1993 | Crabill | G05D 1/0055 |
| | | | | | 342/26 A |
| 2014/0343765 | A1 | * | 11/2014 | Suiter  | G08G 5/0021 |
| | | | | | 701/18 |
| 2017/0345319 | A1 | * | 11/2017 | Wang    | G05D 1/106 |

OTHER PUBLICATIONS

Extended European Search Report including Written Opinion for Application No. EP19215792.3, dated Jun. 22, 2020, pp. 1-5.
Art cited in German Office Action for DE10 2019 100 605.8 dated Dec. 10, 2019, 1 page.

* cited by examiner

*Primary Examiner* — Thomas G Black
*Assistant Examiner* — Ana D Thomas
(74) *Attorney, Agent, or Firm* — Lerner, David, Littenberg, Krumholz & Mentlik, LLP

(57) ABSTRACT

A device for determining a region of impact of an aircraft on the surface of the Earth in the event of an emergency is configured to compare weather forecasts from the past with the weather conditions that are actually occurring and to determine therefrom an uncertainty of the weather forecasts using statistical means. This uncertainty of the weather forecasts is used in addition to position data and state information of the aircraft in order to determine a probable region of impact of the aircraft.

10 Claims, 2 Drawing Sheets

DETERMINING A REGION OF IMPACT OF AN AIRCRAFT IN THE EVENT OF AN EMERGENCY

FIELD OF THE INVENTION

The present description relates in general to the technical field of aviation. In particular, the description relates to a device for determining the region of impact of an aircraft on the surface of the Earth in the event of an emergency. Furthermore, the description relates to a system or a combination of such a device and an aircraft, in particular an aircraft that is unmanned and that flies at high altitude.

BACKGROUND OF THE INVENTION

Aircraft are fundamentally subject to strict safety requirements. These safety requirements relate both to the operation of the aircraft as such as well as also the surrounding area of the aircraft including possible effects of the aircraft on the surface of the Earth.

In order to achieve and/or to prove a specific degree of operational safety, an aircraft and its components may be tested prior to use with regard to operational safety and/or probability of failure. The probability of failure of the entire system aircraft may in this case be influenced by virtue of the fact that specific components are provided as redundant. Beyond a specific value of the probability of failure an aircraft is deemed to be sufficiently safe.

An alternative approach ensures that operational risk during operation of an aircraft is determined continuously in order to be able to take necessary measures in the regions of the surface of the Earth that are affected by the emergency of the aircraft in the event of an emergency in compliance with a required warning time.

BRIEF SUMMARY OF THE INVENTION

Aspects of the invention relate to determining with an increased accuracy the operational risk during the operation of an aircraft.

In accordance with a first aspect, a device is disclosed for determining a region of impact with a point of impact of an aircraft on the surface of the Earth in the event of an emergency. The device comprises a first interface, a second interface and a computing unit. The first interface is embodied so as to receive aircraft data from the aircraft, wherein the aircraft data includes at least a position of the aircraft and also an altitude above the surface of the Earth. The second interface is embodied so as to receive weather data from a weather information source in a recurring process comprising multiple individual receiving steps, wherein the weather data is weather forecasts and also prevailing weather data, and wherein the weather data includes at least air movements in an altitude profile between the aircraft and the surface of the Earth. The device is embodied so as to store the weather data that is received, by way of example in a data storage device, in which the weather data may be stored in a volatile or non-volatile manner. The computing unit is embodied so as to compare the weather forecasts from a preceding receiving step with prevailing weather data from a following receiving step and to determine a deviation between the weather forecasts and the prevailing weather data. The computing unit is further embodied so as to determine a region of impact of the aircraft on the surface of the Earth in the event of an emergency based upon the weather forecast for the point in time of the emergency, the deviation between the weather forecasts from a preceding receiving step and the prevailing weather data and also the position of the aircraft.

Weather data of a weather forecast generally suffers from a specific uncertainty, wherein the extent of the uncertainty is also unknown. If by way of example an emergency leads to the fact that an aircraft approaches the surface of the Earth in an uncontrolled manner or crashes, it is necessary in a short time to determine the region of impact that is possibly affected by the crash in order by way of example to introduce measures to protect the population.

In order to determine the region of impact, weather data is required, by way of example the wind direction and also the wind speed. In general, the exact weather conditions that are prevailing at the point in time of the emergency are not provided because weather conditions are also not ascertained and relayed continuously and without interruption but rather are ascertained and relayed in cyclical time intervals. It is therefore necessary for the procedure for determining a region of impact of an aircraft to use weather data that is some minutes or some hours old and on which a weather forecast has been based. A weather forecast includes uncertainties depending upon the system. These uncertainties have an effect upon the region of impact or the accuracy of the forecast of the region of impact.

The device described herein deals with these uncertainties as follows: for the past, in other words for weather forecasts for preceding time periods, the weather forecast for a point in time is compared with the weather conditions that are actually prevailing at this point in time and the deviation between the forecast and the actual weather is determined. After the weather conditions are ascertained in recurring periods of time and a forecast is created for future periods of time, the forecast for each of these periods of time may be compared with the actual weather that then occurs. The deviation between the forecast and the weather that occurs is determined from this comparison. This deviation is a measure of the uncertainty of the weather forecast. If by way of example the most recent weather data that is ascertained is two hours old at the point in time of an emergency, a weather forecast is used (which from the point of view of the point in time of the most recently ascertained weather data is for two hours in the future) for the procedure for determining the region of impact. As with any prognosis, a weather forecast also includes an uncertainty in relation to its accuracy. In fact, for preceding weather forecasts, the accuracy of which has been determined, it is also possible to extrapolate this accuracy of historical data to the future. The aim in this case is not to provide a point of impact of the aircraft on the surface of the Earth as accurately as possible but rather to provide the probable region of impact taking into consideration the uncertainty of the weather forecast. In other words, this primarily means knowing the system-dependent uncertainty and dealing with it.

The region of impact of the aircraft on the surface of the Earth initially depends upon the position of the aircraft. The altitude above the surface of the Earth and also the geographical coordinates, which by way of example may be provided as the position of the normal on the surface of the Earth are associated with the position of the aircraft. Furthermore, the region of impact depends upon the weather conditions, in particular air movements such as wind direction and wind speed, between the aircraft and the surface of the Earth.

It is possible for the procedure for determining the region of impact to take into account whether the drive of the aircraft is still active or may be activated/deactivated. Alternatively or in addition, it is possible to take into account in which position control flaps of the aircraft are and whether this position may be adjusted. The region of impact may in other words be determined in dependence upon the position of the control flaps and the flight state that results therefrom. The change of the region of impact may likewise be determined in dependence upon the change in the position of the control flaps. If it transpires that the region of impact may be changed in a desirable manner by means of activating the drive or changing the position of the control flaps, corresponding measures may be introduced (actuating the drive with a specific power, changing the position of control flaps).

The region of impact of the aircraft on the surface of the Earth may theoretically be determined precisely in an arbitrary manner if the position of the aircraft, the weather conditions and also the state of the aircraft (by way of example whether the fuselage is broken or not in order to determine the effect of the weather on the aircraft) are known exactly. The position of the aircraft may be determined precisely. The state of the aircraft may likewise be determined sufficiently precisely in order to be able to determine by means of model calculations the influence of air movements and/or the air density on the aircraft. A large part of the inaccuracy is introduced by virtue of the fact that the weather conditions are not ascertained continuously at each location and at each time. On the contrary, weather conditions are generally ascertained cyclically and weather forecasts are created for the time until a new ascertaining step, said weather forecasts naturally being afflicted with uncertainty. A system-dependent uncertainty for the procedure for determining the point of impact of the aircraft on the surface of the Earth results from said weather forecast. In other words, the point of impact of the aircraft on the surface of the Earth may in fact be precisely calculated or simulated, however the input data for this calculation is afflicted with a specific degree of uncertainty.

The device receives aircraft data via the first interface, which includes by way of example the position of the aircraft, its movement direction and its speed. The aircraft may have suitable sensors in order to ascertain this data. The position may be determined by way of example by means of using a satellite-based positioning procedure. Examples for this are GPS (global positioning system) and Galileo. However, it is likewise conceivable that the aircraft determines its position via terrestrial systems. It is possible to use triangulation for this purpose in that the relative position with respect to elements having a known position is drawn upon.

It is also possible to transmit telemetry data of the aircraft to the device via the first interface. This telemetry data may relate by way of example to the drive and the control flaps, and also other information that relates to the aircraft. The device may transmit control commands via the first interface to the aircraft in order for example to activate the drive or to bring the control flaps into a desired position.

It is possible based upon the data that is received via the first interface to create a model or an image of the aircraft. This model may be referred to as a digital twin. The model may be used in order to simulate and to predict the behaviour of the aircraft under different weather conditions.

The model of the aircraft may also be updated if by way of example the operating parameters of the aircraft (in particular the structural state) change. This updated model may then be used for an improved estimation of the falling behaviour (and resulting therefrom the region of impact) with less uncertainty.

The device receives weather data via the second interface from a weather information source, wherein this weather data is thus processed as described above and below. The weather data includes by way of example measurement data from weather stations, forecasts, individual measuring data that is ascertained by means of the aircraft. It is conceivable that the aircraft distributes measuring probes that ascertain weather data on its path in the direction of the surface of the Earth and transmit to the aircraft or another receiving station. Weather data may in particular be vertical profiles. A vertical profile includes by way of example information regarding wind direction, wind speed, temperature, dew point, air moisture above a point of the surface of the Earth at various or multiple altitude increments or pressure increments.

In one embodiment, the device may comprise a data storage device in which the received weather data may be stored. The data storage device may be by way of example a volatile or non-volatile data storage device. Some examples for suitable data storage devices are: hard disks (HDD, SSD), working memory (RAM), read-only memory (ROM).

The first interface may be embodied in the form of an antenna or another device for wireless transmission of data. Data may be transmitted to the aircraft and may be received by the aircraft via the first interface. For this purpose, the aircraft comprises a similar air interface.

The second interface may be wireless or connected via wire. The device is connected via the second interface to a weather information source. This connection may be provided via a public or private network (by way of example the Internet). This means that the weather information source and the device may be spaced spatially away from one another. The weather data may either be retrieved by means of the device from the weather information source or the weather information source provides the weather data as soon as new weather data is available.

The first interface and the second interface are connected to the computing unit in order to be able to exchange data. The computing unit may be a conventional computer or a processor (CPU). The computing unit is prepared and configured in such a manner that it performs the steps described herein for determining the region of impact.

In accordance with one embodiment, the computing unit is embodied so as to divide a distance between the aircraft and the surface of the Earth into a plurality of altitude positions and to determine for each altitude position the influence on the aircraft of the weather that is forecast at the point in time of the emergency. The computing unit is further embodied so as to determine for each altitude position an uncertainty of the determined influence based upon the deviation between the weather forecasts from a preceding receiving step and the prevailing weather data.

The distance between the surface of the Earth and the aircraft may be divided into multiple layers (altitude positions or pressure increments). The distance may be divided uniformly into multiple altitude positions, in other words that each altitude position is identically high. It is however likewise conceivable that the altitude positions are divided in such a manner that the weather conditions are homogenous or are approximately homogenous in one altitude position. By way of example, if there are air movements between the surface of the Earth and the aircraft in various directions and/or at various speeds, the respective altitude positions may be determined in such a manner that the wind direction and/or the wind speed within an altitude position do not differ or do not essentially differ from one another.

It is possible for the influence on the point of impact of the aircraft on the surface of the Earth and also the uncertainty of this to be determined individually for each altitude position. The deviation between the weather forecasts from a preceding step and the actual weather that later occurs may be determined for each altitude position.

In accordance with a further embodiment, the computing unit is further embodied so as to accumulate the uncertainties from all the altitude positions and to determine a total uncertainty of the point of impact.

The weather conditions in the individual altitude positions and also the influence of said weather conditions upon the aircraft overlap one another and may offset or intensify their effect. The uncertainty of the weather forecast in general does not render it possible to state whether and how the actual weather deviates from the forecast. If the worst possible scenario is assumed, it is necessary to assume that the actual weather at the altitude position discloses a deviation in the same direction from the forecast and that these deviations intensify. The total uncertainty may consequently be expressed as the sum of the amounts of the uncertainties of the individual altitude positions.

The computing unit may determine this total uncertainty in that the values of the uncertainty of the individual altitude positions may be added. The uncertainty of the weather forecast in an altitude position may be expressed as an absolute or relative value. By way of example, it is possible for the wind speed of 15 m/s for an uncertainty of +/−3 m/s or 20% to be indicated.

In accordance with a further embodiment, the computing unit is embodied so as to determine for different emergency scenarios respectively a region of impact with a point of impact on the surface of the Earth.

In various emergency scenarios, air movements have different effects on the aircraft. If an aircraft with an intact fuselage goes into a spin, the fall behaviour of said aircraft differs from an aircraft with a broken fuselage. These two mentioned scenarios differ at least in the resistance coefficient and the fall speed of the aircraft.

It may be that the cause of an emergency is not immediately known. Even in such an event it is helpful to calculate or simulate possible regions of impact for various emergency scenarios in order to introduce the advisable measures in all these regions of impact.

In the event of an emergency, the fall speed and the position of the aircraft may be continuously monitored and ascertained by the device. It is possible using these updated parameters for the region of impact to then be continuously newly determined. These parameters may also provide an indication as to which state the aircraft is in. The monitored fall speed may consequently be used in order to continuously newly determine the region of impact during the aircraft crash. The fall speed may be drawn upon in order to determine a resistance coefficient of the aircraft and then to use this resistance coefficient for the purpose of finding how lateral air movements affect the aircraft in the lower altitudes.

In accordance with a further embodiment, the computing unit is embodied so as to obtain a north-south component and an east-west component of the air movements and to draw upon them in the determination of the region of impact.

These lateral air movements (in relation to the fall direction of the aircraft) have a great influence upon the region of impact of the aircraft on the surface of the Earth. The aircraft in other words does not always fall perpendicularly towards the surface of the Earth but rather drifts laterally off course. This is in particular the case in aircraft that fly at particularly high altitude, by way of example in the case of flights in the stratosphere in the case of an altitude of 20 km or more above the surface of the Earth. The influence of the air movements on the aircraft also intensifies if the aircraft has a particularly low weight (under 200 kg or even under 100 kg) and a high resistance coefficient owing to its size (wingspan of more than 10 m or even more than 20 m).

The device described here comprises significant advantages even for such aircraft and the mentioned flight altitudes. Owing to the flight altitude and the relatively low fall speed of temporarily clearly below 10 m/s or even below 5 m/s there remains sufficient warning time with the result that the continuous monitoring of the aircraft in connection with the weather data and also the weather forecast and its uncertainty provides a good contribution for the operational safety when operating the aircraft. It is likewise conceivable that the device described herein is used in order to determine an aircraft position in which a descent of the aircraft is deliberately introduced. In taking into consideration the weather data and also the weather uncertainty, it is possible to select the corresponding aircraft position for the deliberately introduced descent with the result that the point of impact lies in a desired region of the surface of the Earth.

The term "aircraft" in the sense of this description may in particular be an aircraft having the above-described basic conditions relating to weight, wingspan and suitability for the mentioned flight altitude. An "aircraft" may however in general be a flying object that is designed to transport a load. By way of example, an "aircraft" may also be understood as a flying object having mission components for performing missions. Examples of mission components are: environment sensors (by way of example electro-optical sensors, gas sensors, particle sensors, temperature sensors), transmission/receiving units for radio or radar signals, target marking units, etc.

In accordance with a further embodiment, the computing unit is embodied so as to receive weather data from multiple weather information sources and to determine a region of impact based upon the weather data from each weather information source.

By way of example, the weather data from different weather information sources may be used in order to determine regions of impact of the aircraft on the surface of the Earth in dependence upon the weather information source.

It is possible to draw upon historical deviations of the forecasts from the weather that is actually occurring (uncertainty) for the individual weather information sources in order to weigh the individually determined regions of impact with a probability of occurrence. The region of impact that has been determined based upon a weather information source with a (historically) low uncertainty may be characterized as the most probable region of impact. Nevertheless, a region of impact that has been determined based upon a weather information source with a (historically) high uncertainty is also significant and should likewise be taken into account.

In accordance with a further embodiment, the computing unit is embodied so as to determine at least one of the following parameters for the deviation between the weather forecasts and the weather data that is actually occurring for the forecast period of time: average value, median, the simple standard deviation, a positive and a negative maximum value of the deviation.

Essentially, here all the statistical tools are used in order to set a weather forecast in relation to the weather that is actually occurring. It may be relevant to take into account the time interval of the forecast point in time at the weather data that was last actually measured. The uncertainty of weather forecasts tends to decrease with an increasing amount of time from the last actually measured weather data.

In accordance with a further embodiment, the computing unit is embodied so as to determine the region of impact in such a manner that the aircraft impacts with a predetermined probability within the region of impact on the surface of the Earth.

In the present case, the weather forecasts are analysed using statistical means and the uncertainty of said weather forecasts is determined. It is nevertheless possible as a result of extreme and rapid weather changes that the aircraft drifts off course in a manner which was not expected from the perspective of the past. The risk of such influences may be reduced by virtue of the fact that the aircraft is also continuously monitored during the crash in that its position, its lateral movement direction and its fall speed are ascertained.

By way of example, the region of impact may be determined in such a manner that based upon the uncertainties of the weather forecast the aircraft impacts with a probability of 1×10E-9 outside the region of impact that is determined.

In accordance with a further embodiment, the computing unit is embodied so as to furthermore draw upon at least one of the following parameters for the procedure for determining the region of impact: a projected surface of the aircraft, a resistance coefficient, a fall speed.

The projected surface of the aircraft may be provided in advance to the device because the projected surface is in this case a characteristic of the aircraft. The same applies for the resistance coefficient. The resistance coefficient may be determined in an experimental manner for various emergency scenarios. In the event of an emergency, a resistance coefficient may then be predetermined, on the basis of which the region of impact of the aircraft is to be determined. By way of example, it is possible to calculate resistance coefficients for the case that the aircraft spins or that a rupture is present in the structure of the fuselage.

In accordance with a further aspect, a system for operating an aircraft is provided. The system comprises an aircraft and a device as described above and below. The aircraft includes a position determining unit, wherein the position determining unit is embodied so as to determine a position of the aircraft in relation to the surface of the Earth and to transmit said position to the device. The device is embodied so as to determine based upon the transmitted position of the aircraft a region of impact of the aircraft on the surface of the Earth in the event of an emergency.

The aircraft may comprise further sensors in order to transmit state information to the device. By way of example, sensors may be arranged in the aircraft in order to determine the structural integrity of the aircraft or where applicable to identify break points in the fuselage and to transmit to the device. The geographical position as normal above the surface of the Earth may be determined by the position determining unit. The position determining unit is by way of example a receiver for position signals from a satellite-assisted location system such as GPS or Galileo. Such a position determining unit may also determine the altitude above the surface of the Earth. It is possible to determine the fall speed of the aircraft from the change of altitude over time.

The state information that is ascertained by these sensors may flow into the above-mentioned model of the aircraft in order to update the model.

In this system, the device may therefore be used in other words in order to monitor the aircraft during the flight and to display that a selected flight route applies as safe within the scope of the expected safety. In the event of an emergency that arises instantly, a region of impact of the aircraft may be continuously displayed in dependence upon the position of the aircraft and also the weather data and weather forecasts with the uncertainty that is associated with said weather forecasts. The flight route may then be dynamically adapted. by way of example in order to move the aircraft in such a manner that a specific region of the surface of the Earth is not within the region of impact.

In other words, one aspect of the present disclosure may be described as follows: the device described herein for determining the region of impact of the aircraft uses parameters relating to the aircraft and/or elements on board the aircraft and also weather data and forecasts in order to forecast the behaviour of the aircraft during a movement in the direction of the surface of the Earth. The parameters relating to the aircraft and/or elements on board the aircraft may be on the one hand predetermined parameters or parameters that may be predetermined and on the other hand may be parameters that are currently ascertained by sensors, said parameters relating to the aircraft and/or elements on board the aircraft, and also combinations of these two types of parameters. The state of the aircraft and components of said aircraft may be monitored in that state information is ascertained continuously or in predetermined time intervals and is transmitted to the device in order then to be used for the procedure for determining a possible or probable region of impact. This state information may be applied to the digital model of the aircraft. The behaviour of the digital model may be forecast continuously or in time intervals. These forecasts of the behaviour of the digital model may then be compared with the behaviour of the aircraft. Deviations between the two may be used in order to adapt the parameters of the digital model with the result that the forecasts by means of the digital model are closer to the behaviour of the real aircraft. In other words, an iterative approach is implemented which renders possible an improved forecast of the behaviour of an aircraft.

BRIEF DESCRIPTION OF THE DRAWINGS

Exemplary embodiments of the invention are explained in further detail below with the aid of the attached drawings. The illustrations are schematic and not to scale. Identical reference numerals relate to identical or similar elements. In the drawings.

DETAILED DESCRIPTION

Figure 1:
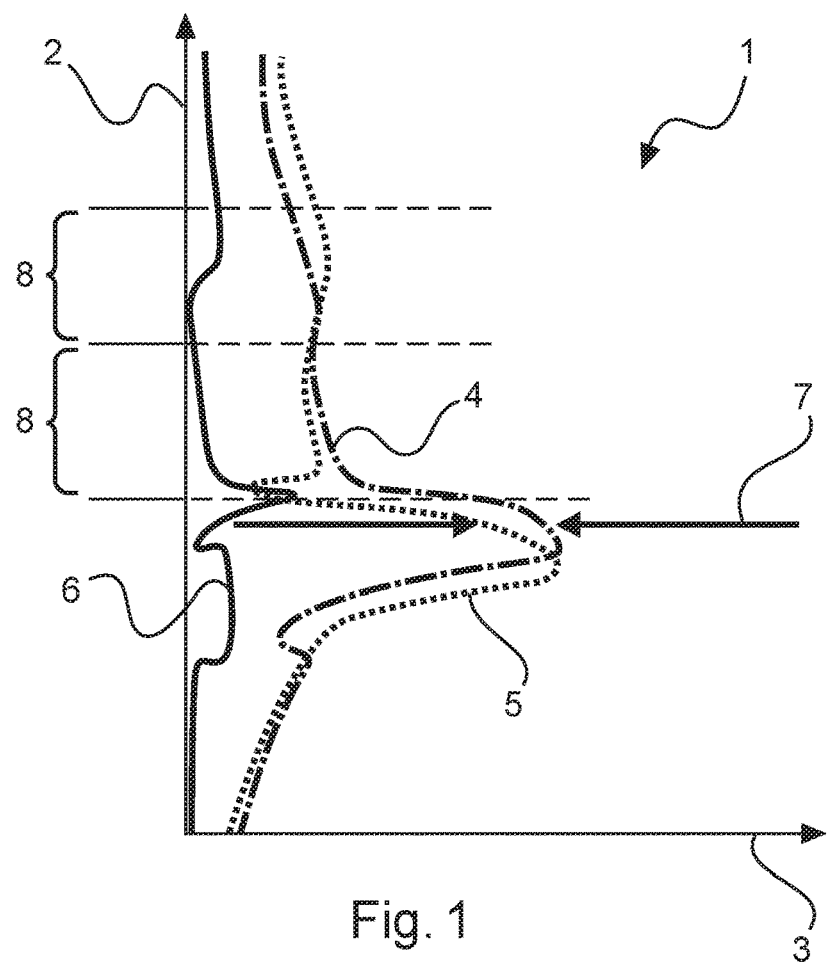
FIG. 1 illustrates schematically wind speeds in various altitude positions.

FIG. 1 illustrates an exemplary weather data diagram 1. The altitude above the surface of the Earth is plotted on the vertical axis 2 and the wind speed is plotted on the horizontal axis 3.

Such a weather data diagram 1 may be generated respectively for air movements in the north-south direction and in the east-west direction. In this case, the wind speed may assume positive or negative values. By way of example, positive values mean a wind movement towards the north or east whereas negative values mean a wind movement towards the south or west.

The altitude may be divided into multiple altitude positions 8 in order to be able to draw upon these altitude positions individually in order to determine the influence on a falling aircraft.

The line 4 that is illustrated as a dashed-dotted line corresponds to the retrieved weather information or the weather forecast for a specific point in time. The dotted line 5 corresponds to the actual weather situation as has been determined for the forecast point in time. The difference between the line 5 and the line 4 corresponds to the deviation 6 between forecast weather and weather that is actually occurring. The deviation 6 is determined as the difference between forecast weather and weather that is actually occurring in a specific altitude position as is illustrated by the two arrows 7 that are pointing to one another.

The deviation 6 may be determined by way of example in that the forecast for the point in time of the next weather measurement is compared to the actual result of the weather measurement that is then performed.

Figure 2:
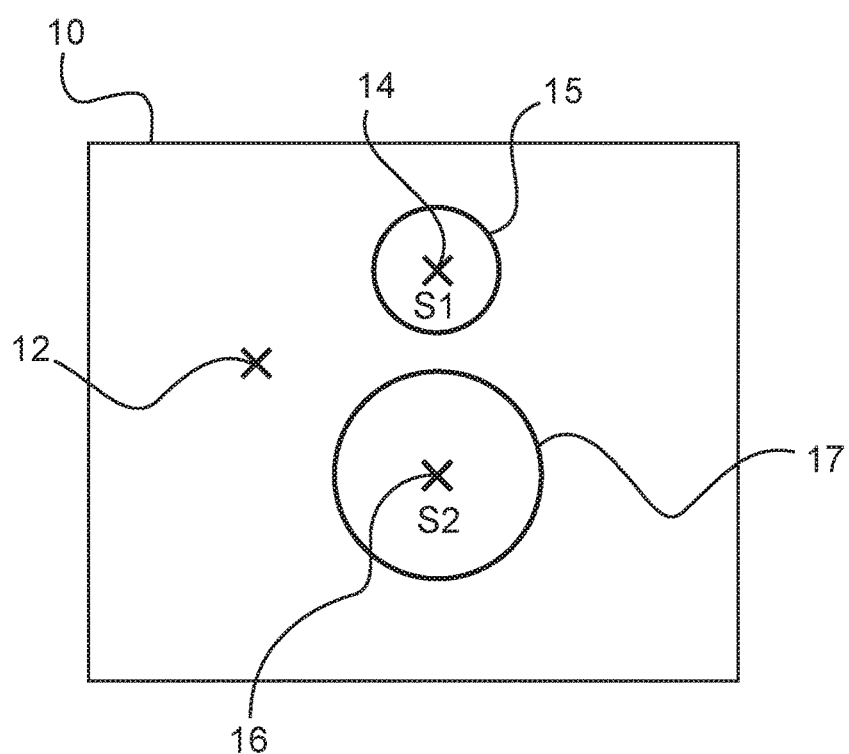
FIG. 2 illustrates schematically regions of impact of an aircraft in various emergency scenarios.

FIG. 2 illustrates in an exemplary manner two regions of impact 15, 17 on the surface of the Earth 10 under specific weather conditions and assuming an aircraft P at the position 12. The first region of impact 15 has been determined using a centre point 14 for a first emergency scenario and the second region of impact 17 has been determined using a centre point 16 for a second emergency scenario.

The diameter of the first region of impact is smaller than the diameter of the second region of impact. This may in particular therefore result in the fact that a higher fall speed of the aircraft is presumed for the first emergency scenario in comparison to the second emergency scenario.

The region of the surface of the Earth 10 that is taken into account may be a map. It is now possible to select the flight route for the operational planning in such a manner that the regions of impact 15, 17 move over the surface of the Earth in dependence upon the movement of the aircraft in such a manner that said regions of impact do not overlap with specific regions of the surface of the Earth. By way of example, the aircraft may be controlled in such a manner that the regions of impact do not overlap with densely populated areas.

Figure 3:
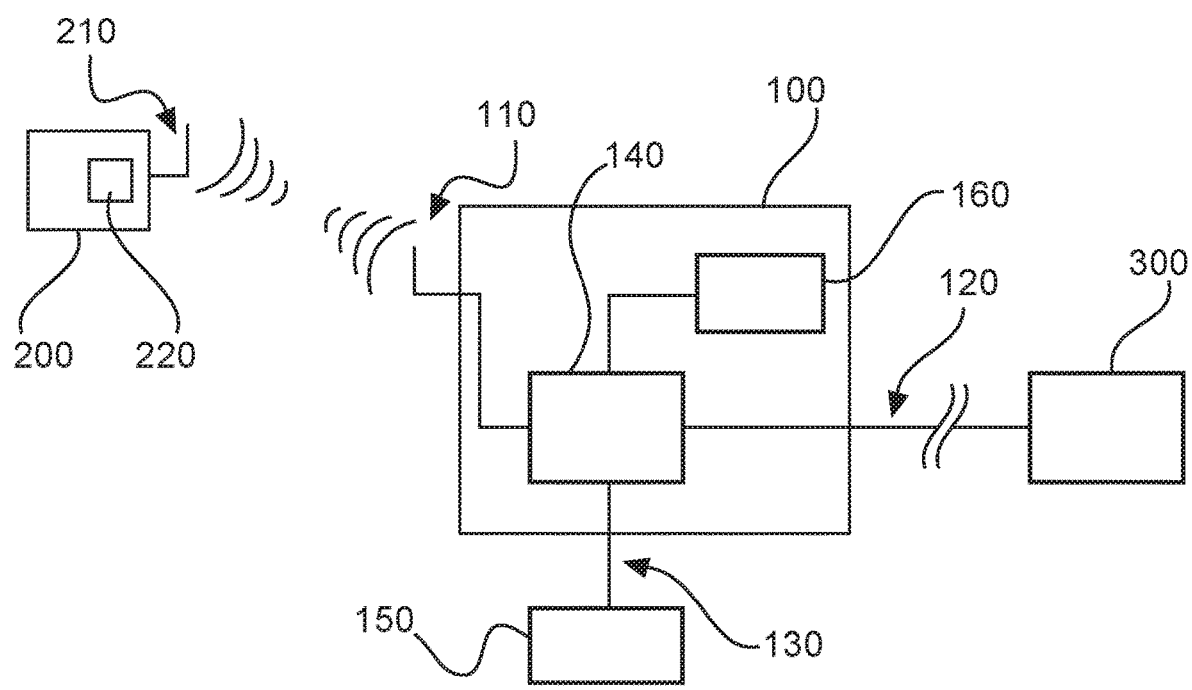
FIG. 3 illustrates schematically a device in accordance with an exemplary embodiment.

FIG. 3 illustrates schematically a device 100 for determining a point of impact of an aircraft 200. The device 100 comprises a first interface 110, a second interface 120 and a third interface 130. Furthermore, the device 100 comprises a computing unit 140 and a data storage device 160.

A wireless connection to an interface 210 of the aircraft 200 may be produced via the first interface 110. It is possible via this connection to transmit data in a bidirectional or unidirectional manner. The aircraft 200 comprises a position determining unit 220. The position determining unit 220 is by way of example a GPS receiver and is embodied so as to determine a position of the aircraft 200. Position data and other data relating to the aircraft may be transmitted via the connection between the interface 210 and the first interface 110. The interface 210 and the interface 110 may be by way of example antennae.

The second interface 120 is used for the purpose of receiving data from a weather information source 300. The second interface 120 may be by way of example a network connection in order to reach the weather information source 300 via an interconnected network (by way of example the internet).

The third interface 130 is used for the purpose of connecting and actuating a display unit 150. The display unit 150 may also be embodied as a part of the device 100. The display unit may be a monitor or a display on which a section of a map, the position of the aircraft and also at least one region of impact is displayed in the event of an instant emergency.

The data storage device 160 is used for the purpose of storing weather data and for performing the later statistical evaluation. The data storage device may be by way of example a hard disk.

The computing unit 140 may be a processor that is embodied so as to perform the steps described herein in order to determine at least one region of impact of an aircraft under the prevailing weather conditions.

Figure 4:
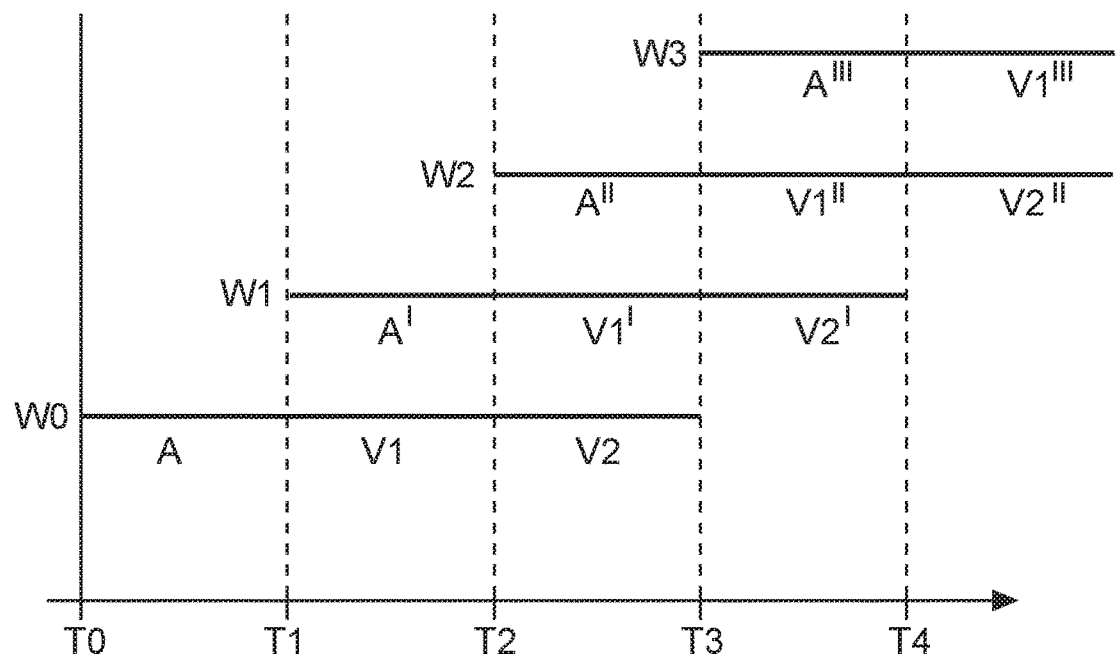
FIG. 4 illustrates schematically cyclically updated weather data and also weather forecasts.

FIG. 4 illustrates schematically how weather data and also forecasts are processed in order to determine the region of impact and the uncertainty of the region of impact. These steps are performed by the computing unit 140 in that for this purpose the weather information is used that is received from the weather information source 300 and that is stored in the data storage device 160.

At a first point in time T0, weather data W0 is provided by the weather information source 300. This weather data includes initially information A relating to the prevailing weather and forecasts V1 and V2 relating to the future. Even if in FIG. 4 the forecasts are only illustrated over two future cycles, the forecasts may extend over more than the two future cycles.

At a second point in time T1, weather data W1 is provided by the weather information source 300. As with the weather data W0, the weather data W1 also includes information A' relating to the prevailing weather and forecasts V1' and V2'. The information A' of the weather data W1 relates to the same period of time as the information V1 of the weather data W0.

The accuracy of the forecasts in the weather data W0 may consequently be determined via comparison of A' and V1.

Reference is to be made to the fact that weather data itself typically illustrates a preceding state of the weather conditions when said weather data is first available and may be a few minutes or even hours old. This means that for the procedure for determining a region of impact of the aircraft on the surface of the Earth an operator then works with a weather forecast if the aircraft crashes immediately after retrieving weather data. For this reason, it is helpful to know the uncertainty of forecasts.

At a third point in time T2, weather data W2 is provided by the weather information source 300. As with the weather data W0 and W1, the weather data W2 also includes information A" relating to the prevailing weather and forecasts V1" and V2". The information A" of the weather data W2 relates to the same period of time as the information V1' of the weather data W1 and V2 of the weather data W0.

It is consequently possible via a comparison of A" and V1' to determine the accuracy of the forecast in the weather data W2. The comparison of A' with V1 and A" with V1' provides the uncertainty of the short-term weather forecast (respectively one cycle retrospectively) whereas the comparison of A" with V2 and A'" with V2' indicates an uncertainty of the longer-term forecast. It is consequently also possible to determine the uncertainty in dependence upon the age of the most recently available weather data. This uncertainty tends to increase the more time that has passed since the last update of the weather data. The greater the time interval between the most recently available weather data and an emergency of the aircraft, the greater the uncertainty of the region of impact that is determined. The computing unit 140 may take this time interval into account for determining the region of impact, by way of example using an exponentially growing multiplicator in dependence upon the time interval.

Typically, updated weather data is provided in an interval of 6 hours. As long as this weather data is actually provided every 6 hours, it may be sufficient for determining the deviation between A' and V1, A" and V1', etc. However, it may be expedient to also determine the longer-term deviation over more than one future cycle (in other words between A" and V2, A'" and V2') in order to be able to likewise determine a region of impact for the case of missing weather data.

The weather data is stored in the data storage device 160. The deviation between the forecast in the preceding receiving step and the actual weather conditions is determined continuously by means of the processor in an immediately following receiving step. In order to reach a greater statistical significance, this deviation may be determined over multiple days or even weeks.

The deviation that is determined in this manner is the measure of the uncertainty when calculating the point of impact of an aircraft on the surface of the Earth in the case of otherwise known or predetermined conditions (in particular fall speed and resistance coefficient). The uncertainty is used for the purpose of providing a point of impact that may be in itself precisely calculated using a broad range of possible deviations, said point of impact then being illustrated as the region of impact on a map.

In addition, reference is to be made to the fact that "including" or "comprising" do not exclude other elements or steps and "a" or "one" do not exclude a plurality. Moreover, reference is to be made to the fact that features or steps that have been described with reference to one of the above exemplary embodiments may also be used in combination with other features or steps of other exemplary embodiments described above. Reference numerals in the claims are not to be seen as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 Weather data diagram
2 Altitude
3 Wind speed
4 Retrieved weather information
5 Actual weather situation
6 Deviation
7 Information error
8 Altitude position
10 Region of the surface of the Earth that is taken into account
12 Position of an aircraft
14 Point of impact in scenario 1
15 Region of impact
16 Point of impact in scenario 2
17 Region of impact
100 Device for determining a point of impact of an aircraft
110 First interface
120 Second interface
130 Third interface
140 Computing unit
150 Display unit
160 Data storage device
200 Aircraft
210 Data transmission interface
220 Position determining unit
300 Weather information source

The invention claimed is:

1. A device for determining a region of impact with a point of impact of an unmanned aircraft on the surface of the Earth in the event of an emergency in which the aircraft approaches the surface of the Earth in an uncontrolled manner or crashes, the device comprising:
   a first interface configured to receive aircraft data from the aircraft, wherein the aircraft data includes at least a position of the aircraft and an altitude above the surface of the Earth;
   a second interface configured to receive weather data from a weather information source in a recurring process comprising multiple individual receiving steps, wherein the weather data is weather forecasts and prevailing weather data, and wherein the weather data includes at least air movements in an altitude profile between the aircraft and the surface of the Earth;
   wherein the device is configured to store the weather data that is received;
   wherein the device furthermore comprises a computing unit configured to compare the weather forecasts from a preceding receiving step with prevailing weather data from a following receiving step and to determine a deviation between the weather forecasts for a point in time and the weather data actually prevailing at the point in time, to thereby determine an uncertainty of the weather forecast;
   wherein the computing unit is configured to determine the region of impact of the aircraft on the surface of the Earth in the event of an emergency based upon the weather forecast for the point in time of the emergency, the deviation between the weather forecasts for the point in time from a preceding receiving step and the weather data actually prevailing at the point in time, and the position of the aircraft; and
   wherein the region of impact of the aircraft on the surface of the Earth indicates a probable region of impact in consideration of the uncertainty of the weather forecast.

2. The device according to claim 1,
   wherein the computing unit is configured to divide a distance between the aircraft and the surface of the Earth into a plurality of altitude positions and to determine for each altitude position the influence on the aircraft of the weather that is forecast at the point in time of the emergency; and
   wherein the computing unit is further configured to determine for each altitude position an uncertainty of the determined influence based upon the deviation between the weather forecasts from a preceding receiving step and the prevailing weather data.

3. The device according to claim 2, wherein the computing unit is further configured to accumulate the uncertainties from all the altitude positions and to determine a total uncertainty of the point of impact.

4. The device according to claim 1, wherein the computing unit is configured to determine for different emergency scenarios respectively a region of impact with a point of impact on the surface of the Earth.

5. The device according to claim 1, wherein the computing unit is configured to obtain a north-south component and an east-west component of the air movements and to draw upon the north-south component and the east-west component in the determination of the region of impact.

6. The device according to claim 1, wherein the computing unit is configured to receive weather data from multiple weather information sources and to determine a region of impact based upon the weather data from each weather information source.

7. The device according to claim 1, wherein the computing unit is configured to determine at least one of the following parameters for the deviation between the weather forecasts and the weather data that is actually occurring for the forecast period of time: average value, median, simple standard deviation, a positive and a negative maximum value of the deviation.

8. The device according to claim 1, wherein the computing unit is configured to determine the region of impact in such a manner that the aircraft impacts with a predetermined probability within the region of impact on the surface of the Earth.

9. The device according to claim 1, wherein the computing unit is configured to further draw upon at least one of the following parameters for the procedure for determining the region of impact: a projected surface of the aircraft, a resistance coefficient, and a fall speed.

10. A system for operating an unmanned aircraft, comprising:
 an unmanned aircraft having a position determining unit;
 a device according to claim 1;
 wherein the position determining unit is configured to determine a position of the aircraft in relation to the surface of the Earth and to transmit said position to the device;
 wherein the device is configured to determine based upon the transmitted position of the unmanned aircraft a region of impact of the unmanned aircraft on the surface of the Earth in the event of an emergency.

\* \* \* \* \*